(12) United States Patent
Maruyama et al.

(10) Patent No.: US 8,077,573 B2
(45) Date of Patent: Dec. 13, 2011

(54) OPTICAL DISK APPARATUS AND DISK IDENTIFICATION METHOD

(75) Inventors: Hideki Maruyama, Yokohama (JP); Yukinobu Tanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 132 days.

(21) Appl. No.: 12/424,631

(22) Filed: Apr. 16, 2009

(65) Prior Publication Data

US 2009/0262613 A1    Oct. 22, 2009

(30) Foreign Application Priority Data

Apr. 18, 2008    (JP) ................................. 2008-109418

(51) Int. Cl.
*G11B 7/00* (2006.01)
(52) U.S. Cl. ................................. 369/53.23; 369/53.22
(58) Field of Classification Search ............... 369/53.22, 369/53.23, 53.24
See application file for complete search history.

(56) References Cited

U.S. PATENT DOCUMENTS

| | | | |
|---|---|---|---|
| 5,432,762 A | 7/1995 | Kubo et al. | |
| 5,745,461 A | 4/1998 | Kawasaki | |
| 5,917,791 A | 6/1999 | Tsuchiya et al. | |
| 2005/0063269 A1 | 3/2005 | Miyake et al. | |
| 2005/0152252 A1* | 7/2005 | Horimoto | 369/53.23 |
| 2007/0195670 A1 | 8/2007 | Juan | |
| 2008/0080345 A1 | 4/2008 | Hasegawa | |
| 2008/0247291 A1* | 10/2008 | Kawaguchi | 369/53.23 |
| 2008/0291802 A1* | 11/2008 | Chuang | 369/53.22 |

FOREIGN PATENT DOCUMENTS

| | | |
|---|---|---|
| JP | 58-191036 | 11/1983 |
| JP | 58-191037 | 11/1983 |
| JP | 04-255925 | 9/1992 |
| JP | 05-128537 | 5/1993 |
| JP | 06-150563 | 5/1994 |
| JP | 09-161387 | 6/1997 |
| JP | 09-161388 | 6/1997 |
| JP | 09-204703 | 8/1997 |
| JP | 10-198967 | 7/1998 |
| JP | 10-302380 | 11/1998 |
| JP | 2000-222811 | 8/2000 |
| WO | WO 2008/012718 | 1/2008 |

* cited by examiner

*Primary Examiner* — Adam R Giesy
(74) *Attorney, Agent, or Firm* — Antonelli, Terry, Stout & Kraus, LLP.

(57) ABSTRACT

A highly reliable optical disk apparatus adapted to record and reproduce the information in and from plural types of optical disks is disclosed. An acquisition unit acquires a predetermined signal from the reflected light obtained by radiating a predetermined laser on each of the optical disks. A comparator compares the waveform of the signal acquired by the acquisition unit with the comparative waveform of the signal stored in a memory beforehand and obtained from the radiated laser corresponding to the optical disk. An identification unit identifies the type of the optical disk based on the result of comparison by the comparator.

16 Claims, 12 Drawing Sheets

| IDEAL WAVEFORM | FOCUS ERROR COINCIDENCE DEGREE | PULL-IN ERROR COINCIDENCE DEGREE |
|---|---|---|
| ONE-LAYER BD | 30% | 20% |
| TWO-LAYER BD | 60% | 60% |
| FOUR-LAYER BD | 90% | 80% |
| ONE-LAYER HDDVD | 10% | 20% |
| TWO-LAYER HDDVD | 15% | 20% |
| THREE-LAYER HDDVD | 20% | 30% |
| ONE-LAYER DVD | 2% | 2% |
| TWO-LAYER DVD | 10% | 5% |
| CD | 1% | 2% |
| NO MEDIUM | 1% | 1% |

| IDEAL WAVEFORM | FOCUS ERROR COINCIDENCE DEGREE | PULL-IN ERROR COINCIDENCE DEGREE |
|---|---|---|
| ONE-LAYER BD | 30% | 20% |
| TWO-LAYER BD | 60% | 60% |
| FOUR-LAYER BD | 90% | 80% |
| ONE-LAYER HDDVD | 10% | 20% |
| TWO-LAYER HDDVD | 15% | 20% |
| THREE-LAYER HDDVD | 20% | 30% |
| ONE-LAYER DVD | 2% | 2% |
| TWO-LAYER DVD | 10% | 5% |
| CD | 1% | 2% |
| NO MEDIUM | 1% | 1% |

FIG.5

| TIME(t) | IDEAL WAVEFORM | ACTUAL ACQUIRED VALUE | DIFFERENCE |
|---|---|---|---|
| 0 | 0 | 0.1 | 0.1 |
| 0.1 | 1 | 1.1 | 0.1 |
| 0.2 | 2 | 2.2 | 0.2 |
| 0.3 | 3 | 3.3 | 0.3 |
| 0.4 | 4 | 4.4 | 0.4 |
| 0.5 | 5 | 5 | 0 |
| 0.6 | 4 | 4.2 | 0.2 |
| 0.7 | 3 | 3.1 | 0.1 |
| 0.8 | 2 | 1.8 | −0.2 |
| 0.9 | 1 | 1 | 0 |
| 1.0 | 0 | 0.2 | 0.2 |
| 1.1 | 0 | 0.1 | 0.1 |
| 1.2 | 2 | 2.2 | 0.2 |
| 1.3 | 4 | 4.3 | 0.3 |
| 1.4 | 6 | 6.5 | 0.5 |
| 1.5 | 8 | 9.0 | 1 |
| 1.6 | 10 | 10 | 0 |
| 1.7 | 8 | 7.8 | −0.2 |
| 1.8 | 6 | 5.8 | −0.2 |
| 1.9 | 4 | 4.2 | 0.2 |
| 2.0 | 2 | 1.9 | −0.1 |
| 2.1 | 0 | 0.1 | 0.1 |
|  |  |  | TOTAL: 3.3 |

FIG.7

| TIME(t) | IDEAL WAVEFORM | ACTUAL ACQUIRED VALUE | DIFFERENCE |
|---|---|---|---|
| 0 | 0 | 0.15 | 0.15 |
| 0.1 | 1 | 1.65 | 0.65 |
| 0.2 | 2 | 3.3 | 1.3 |
| 0.3 | 3 | 4.95 | 1.95 |
| 0.4 | 4 | 6.6 | 2.6 |
| 0.5 | 5 | 7.5 | 2.5 |
| 0.6 | 4 | 6.3 | 2.3 |
| 0.7 | 3 | 6 | 3 |
| 0.8 | 2 | 5.9 | 3.9 |
| 0.9 | 1 | 6.2 | 5.2 |
| 1.0 | 0 | 8 | 8 |
| 1.1 | 0 | 14 | 14 |
| 1.2 | 2 | 15 | 13 |
| 1.3 | 4 | 15 | 11 |
| 1.4 | 6 | 15 | 9 |
| 1.5 | 8 | 15 | 7 |
| 1.6 | 10 | 15 | 5 |
| 1.7 | 8 | 11.7 | 3.7 |
| 1.8 | 6 | 8.7 | 2.7 |
| 1.9 | 4 | 6.3 | 2.3 |
| 2.0 | 2 | 2.85 | 0.85 |
| 2.1 | 0 | 0.15 | 0.15 |
| | | | TOTAL:100.25 |

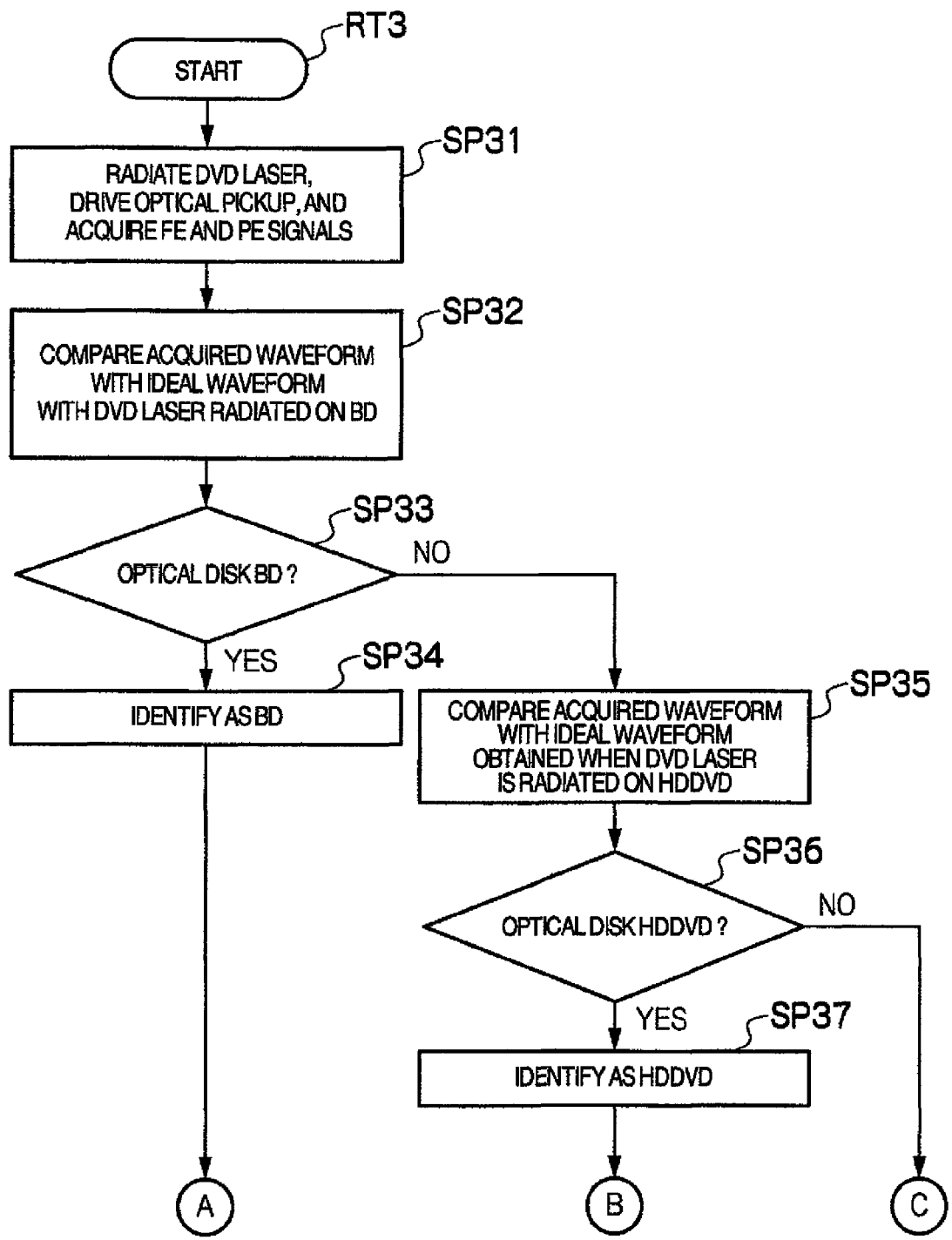

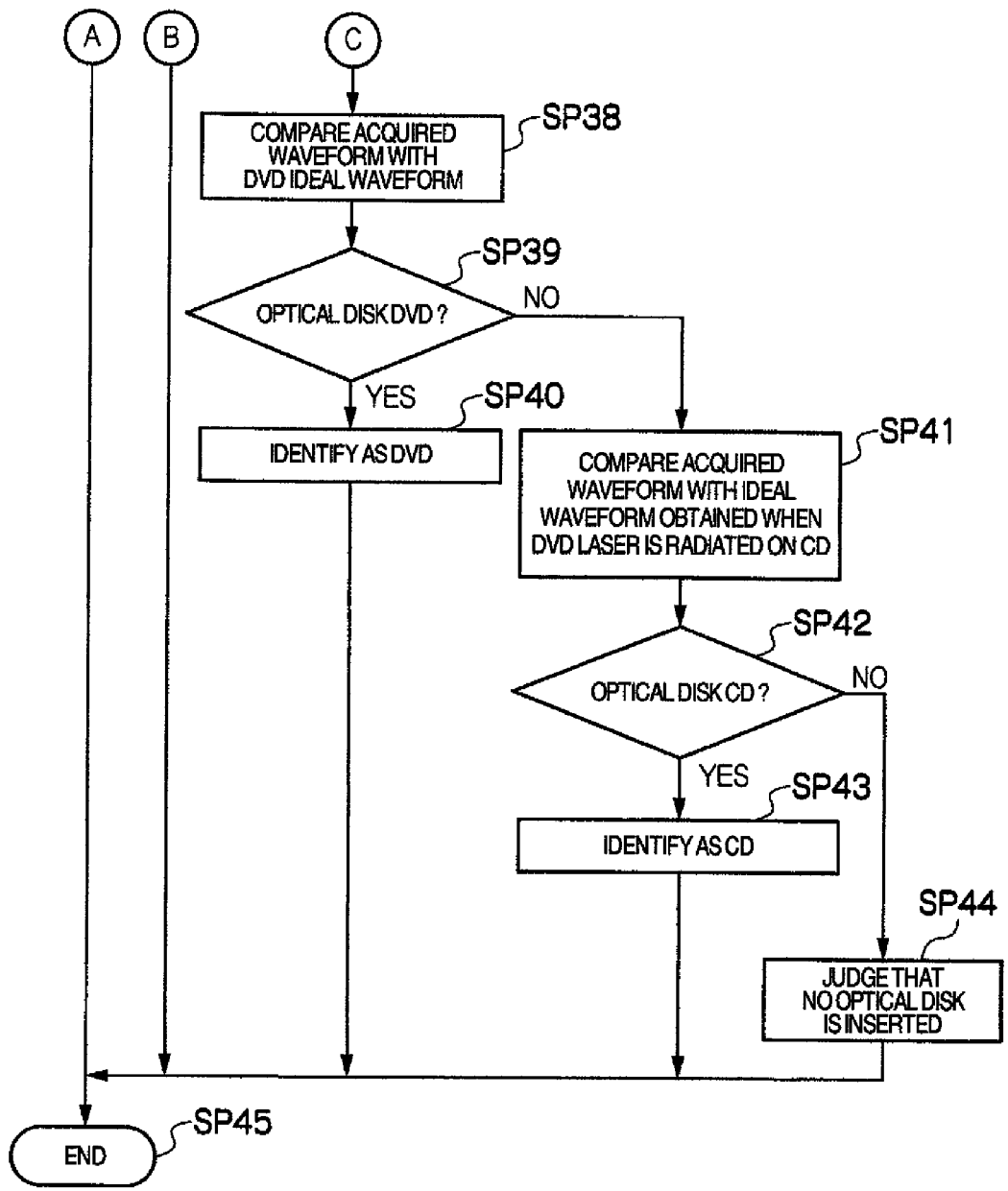

OPTICAL DISK APPARATUS AND DISK IDENTIFICATION METHOD

BACKGROUND OF THE INVENTION

This invention relates to an optical disk apparatus and a disk identification method, or in particular, an optical disk apparatus for reproducing plural types of optical disks.

In the conventional technique finding wide application to an optical disk apparatus for reproducing the information from plural types of optical disks such as CD (Compact Disk) and DVD (Digital Versatile Disk), the type of the optical disk is identified based on the signal of the light reflected from the optical disk to which the light is radiated from an optical pickup.

This technique for identifying the type of the optical disk uses, for example, a method based on a signal of a focus error (focus error signal) obtained by driving the lens of the optical pickup in the direction toward the optical disk and an error signal of the total amount of light (pull-in error signal) of the optical pickup and a predetermined threshold value, or a method in which the sector mark of the optical disk is detected and the type of the optical disk is identified based on the position at which the sector mark is detected.

According to the technique for detecting the sector mark disclosed in JP-A-6-150563, for example, a gate signal is generated from the timing signal based on a pulse signal read from an optical disk, and the width of this gate signal is matched with each match data set by measurement at a predetermined frequency and appropriately changed, so that the sector mark of a different bit rate is excluded from the matching value and the sector mark length data, thereby identifying and detecting a corresponding sector mark.

SUMMARY OF THE INVENTION

Recently, in addition to CD, DVD, the support media of the optical disk apparatus used also with HDDVD (High Definition DVD) and BD (Blu-ray Disk) have increased to such an extent as to pose the problem of committing an error in the identification of the optical disk to the limit of the standard (or in violation of the standard). Also in the technical viewpoint, the objective lens and the laser of the optical pickup have been increasingly shared to reduce the cost, thereby also posing the problem of making an error in the identification of the optical disk as a medium in terms of the optical efficiency.

Specifically, the optical disk apparatus in current use checks the relation of the waveforms of the focus error signal and the pull-in error signal with a predetermined threshold value and identifies the type of the optical disk from the absolute amplitude value and the time intervals of the waveforms. As described above, however, the problem is that the increased support media and the variations of the optical disks has made it difficult to identify the type of the optical disk based on a threshold value. Also, the appearance of a multilayer BD expected in future is considered to further increase the difficulty of identification using a threshold value.

This invention has been achieved in view of the points described above, and the object thereof is to provide an optical disk apparatus and a disk identification method high in reliability.

In order to achieve the object described above, according to one aspect of the invention, there is provided an optical disk apparatus for performing the recording and reproducing operation on plural types of optical disks, comprising an acquisition unit for acquiring a predetermined signal from the reflected light obtained by radiating a predetermined laser on an optical disk, a comparator for comparing the waveform of the signal obtained by the acquisition unit with a comparative waveform of the signal generated by radiating a corresponding laser on the plural types of the optical disks and stored in a memory beforehand, and an identification unit for identifying the type of the optical disk based on the result of the comparison made by the comparator.

According to another aspect of the invention, there is provided a disk identification method of an optical disk apparatus for performing the recording and reproducing operation on plural types of optical disks, comprising a first step executed by an acquisition unit to acquire a predetermined signal from the reflected light obtained by radiating a predetermined laser on an optical disk, a second step executed by a comparator to compare the waveform of the signal acquired in the first step with the comparative waveforms of the signals obtained by radiating the corresponding lasers on the plural types of the optical disks and stored in a memory beforehand, and a third step executed by an identification unit to identify the type of the optical disk based on the result of the comparison made in the second step.

According to still another aspect of the invention, there is provided an optical disk apparatus for performing the recording and reproducing operation on plural types of optical disks, comprising an acquisition unit for acquiring a predetermined signal from the reflected light obtained by radiating a predetermined laser on an optical disk, a comparator for comparing the waveform of the signal acquired by the acquisition unit with the ideal waveforms of the signals obtained by radiating the corresponding lasers on the plural types of the optical disks and stored in a memory beforehand, and an identification unit for identifying the type of the optical disk based on the result of the comparison made by the comparator.

In the apparatus and method according to the invention, the signal is sampled and compared as a whole, and therefore, the accuracy at which the optical disk is identified is improved without regard to the variations or the noises such as a spike noise which may be detected at the time of medium identification.

According to this invention, an optical disk apparatus and a disk identification method high in reliability can be realized.

Other objects, features and advantages of the invention will become apparent from the following description of the embodiments of the invention taken in conjunction with the accompanying drawings.

BRIEF DESCRIPTION OF THE DRAWINGS

FIG. 3 is a schematic diagram for explaining an identification result table.

FIG. 5 is a schematic diagram for explaining a coincidence degree calculation table.

FIG. 7 is a schematic diagram for explaining a coincidence degree calculation table.

FIG. 12 is a flowchart showing yet another example of the steps of the disk identification process.

FIG. 13 is a flowchart showing a further example of the steps of the disk identification process.

DESCRIPTION OF THE EMBODIMENTS

An embodiment of the invention is described in detail below with reference to the drawings.

Figure 1:
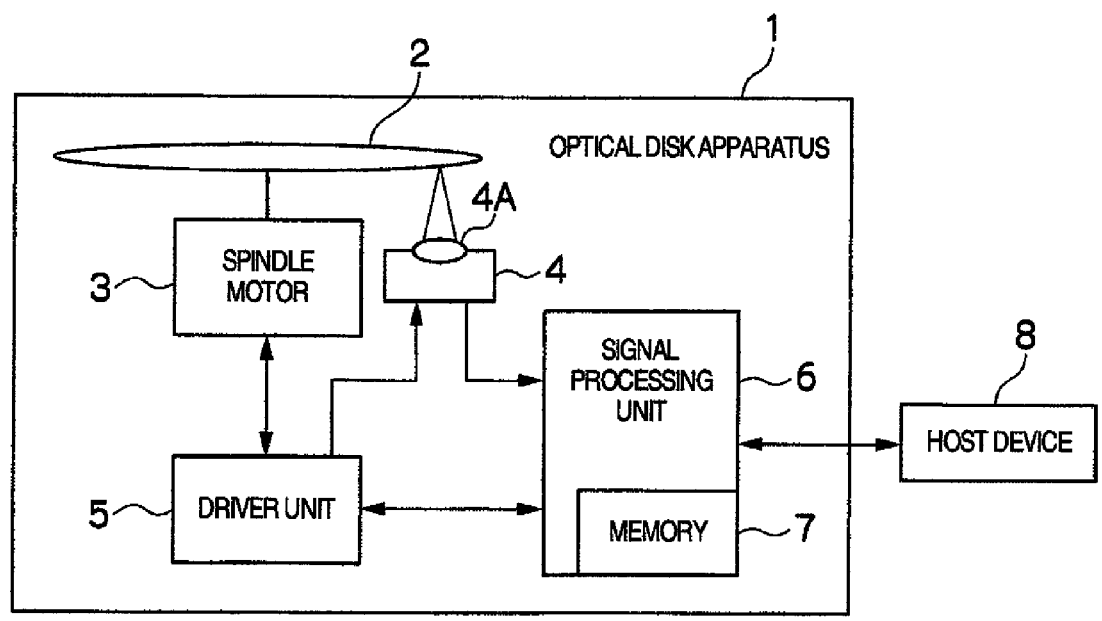
FIG. 1 is a block diagram schematically showing the configuration of an optical disk apparatus according to this invention.

FIG. 1 is a diagram showing an example of the configuration of the optical disk apparatus 1 according to this embodiment. The optical disk apparatus 1 is configured of a spindle motor 3 for rotationally driving an optical disk 2, an optical pickup 4 for acquiring the signal of the reflected light based on the light radiated on the optical disk 2, a driver unit 5 for driving the spindle motor 3 and the optical pickup 4, and a signal processing unit 6 for executing the various signal processing operation based on the signal of the reflected light acquired from the optical pickup 4 and transmitting a reproduction signal or the like to a host device 8. Also, the signal processing unit 6 includes a memory 7 for storing various waveforms described later. The memory 7 may be attached to the exterior of the apparatus.

The optical disk apparatus 1 stores and reproduces the information into and from plural types of optical disks 2 such as CD, DVD, HDDVD and BD. The driver unit 5, upon insertion of the optical disk 2 into the optical disk apparatus 1, drives the spindle motor 3 while at the same time controlling the optical pickup 4.

The optical pickup 4, under the control of the driver unit 5, causes a laser diode (not shown) to emit and radiate the light on the optical disk 2 on the one hand and acquires the signal of the reflected light by displacing an objective lens 4A and transmits the signal of the reflected light to the signal processing unit 6 on the other hand. Incidentally, the laser diode emits and radiates the laser light of the CD, the laser light of the DVD, the laser light of the HDDVD and the laser light of the BD on the optical disk 2. Either a single laser diode may radiate plural types of laser or plural laser diodes each may radiate the corresponding laser.

The signal processing unit 6 detects a focus error signal, a signal indicating a tracking error (tracking error signal) and a pull-in error signal from the signal of the reflected light obtained from the optical pickup 4.

Then, the signal processing unit 6 compares the waveform of the focus error signal and the waveform of the pull-in error signal acquired by sampling the focus error signal and the pull-in error signal, respectively, with the ideal waveforms of the focus error signal and the ideal waveforms of the pull-in error signal of plural types of the optical disk 2 thereby to carry out the pattern matching process. The signal processing unit 6, by executing the pattern matching in this way, judges whether the optical disk 2 is a CD, a DVD, a HDDVD, a BD or there is no medium and transmits the judgment result to the driver unit 5.

In the optical disk apparatus 1, the focus error signal and the pull-in error signal are sampled and compared as a whole, and therefore, as compared with the conventional disk identification method based on a threshold value, the identification accuracy of the optical disk 2 is improved without regard to the variations or the noises such as a spike noise which may be detected at the time of medium identification.

Incidentally, the signal processing unit 6, by executing the process described above, also judges how many layers the DVD or the BD has. The pattern matching process of the sampling waveforms and the ideal waveforms of the focus error signal and the pull-in error signal is described later.

Then, the driver unit 5, upon reception of a play command for the optical disk from the host device 8 through the signal processing unit 6, drives the spindle motor 3 while at the same time controlling the optical pickup unit 4 in such a manner as to radiate the laser on the optical disk 2 identified, acquire the signal of the reflected light at the corresponding point and transmit the signal of the reflected light to the signal processing unit 6.

Then, the signal processing unit 6 variously processes the signal of the reflected light acquired from the optical pickup 4 to generate and transmit a play signal to the host device 8. Also, the signal processing unit 6 detects the focus error signal, the tracking error signal, the pull-in error signal, etc. from the signal of the reflected light acquired from the optical pickup 4, and transmits the particular focus error signal, etc. to the driver unit 5. The driver unit 5, based on the focus error signal acquired from the signal processing unit 6, controls the spindle motor 3 and the optical pickup 4 by feedback.

The storage process, though not described in this embodiment, can be executed in the selected optical disk 2 with the conventional technique.

Figure 2:
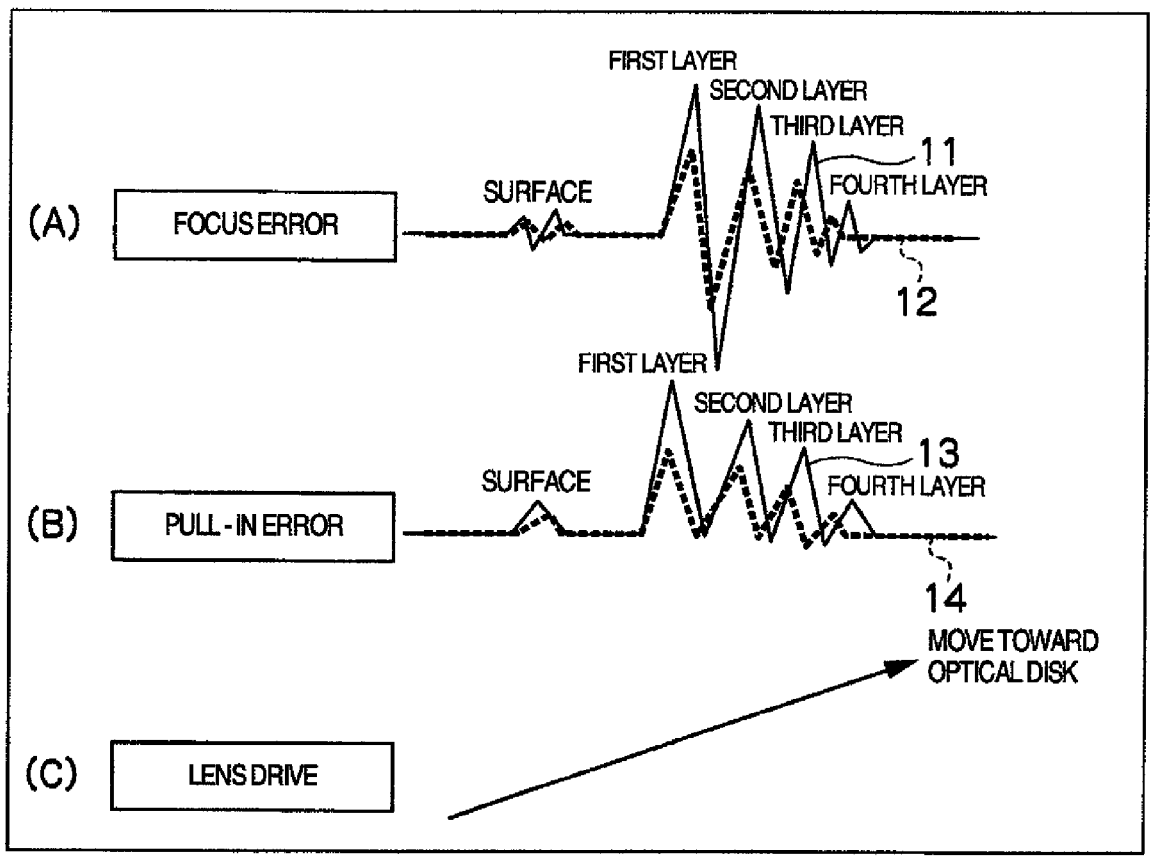
FIG. 2 is a schematic diagram for explaining a method of identifying an optical disk.

FIG. 2 is a diagram showing an example of the method of identifying the optical disk 2 according to this embodiment.

The optical disk apparatus 1 drives the objective lens 4A of the optical pickup 4 in the direction toward the optical disk 2 ((C) of FIG. 2). As a result, the optical disk apparatus 1 acquires the waveform 11 of the focus error signal and the waveform 13 of the pull-in error signal by sampling the focus error signal and the pull-in error signal, respectively.

In the optical disk apparatus 1 having a 4-layer BD as the optical disk 2, for example, assume that the laser for the BD (hereinafter referred to as the BD laser) is radiated to drive the objective lens 4A in the direction toward the optical disk 2 of the 4-layer BD. Then, the waveform 11 of the focus error signal and the waveform 13 of the pull-in error signal change in amplitude value when the BD laser is passed through the front surface, the first-layer recording surface, the second-layer recording surface, the third-layer recording surface and the fourth-layer recording surface ((A) and (B) of FIG. 2).

The memory 7 of the signal processing unit 6 of the optical disk apparatus 1, on the other hand, stores the ideal waveform 12 of the focus error signal and the ideal waveform 14 of the pull-in error signal with the corresponding laser radiated on each of the various optical disks 2 (hereinafter sometimes referred to simply as the ideal waveform 12 of the CD focus error signal, etc.) such as the CD, the one-layer DVD, the two-layer DVD, the one-layer HDDVD, the two-layer HDDVD, the three-layer HDDVD, the one-layer BD, the two-layer BD and the four-layer BD. Incidentally, the memory 7 also stores the ideal waveform 12 of the focus error signal and the ideal waveform 14 of the pull-in error signal in the absence of a medium.

In the optical disk apparatus 1, the waveform 11 of the focus error signal and the waveform 13 of the pull-in error signal are compared with the corresponding ideal waveform 12 of the focus error signal and the corresponding ideal waveform 14 of the pull-in error signal, respectively, to execute the pattern matching and thereby to identify the optical disk 2.

In the optical disk apparatus 1, for example, the waveform 11 of the focus error signal is compared with the ideal waveform 12 of the focus error signal for the four-layer BD (the ideal waveform 12 of the focus error signal with the BD laser radiated on the optical disk 2 making up the four-layer BD) to carry out the pattern matching process on the one hand, and the waveform 13 of the pull-in error signal is compared with the ideal waveform 14 of the pull-in error signal for the four-layer BD to execute the pattern matching process on the other hand, thereby identifying the optical disk ((A), (B) of FIG. 2).

FIG. 3 is a diagram showing an example of the configuration of an identification result table 21 showing the result of identification of the optical disk 2 by the pattern matching process developed in the memory 7 of the signal processing unit 6 according to this embodiment.

The identification result table 21, to identify the optical disk 2, stores the degree of coincidence (hereinafter sometimes referred to as the coincidence degree) as the result of the pattern matching of the waveform 11 of the focus error signal and the waveform 13 of the pull-in error signal with the ideal waveform 12 of the focus error signal and the ideal waveform 14 of the pull-in error signal, respectively.

The identification result table 21 is configured of an ideal waveform column 21A for uniquely identifying the type of the ideal waveform of the optical disk 2, a focus error coincidence degree column 21B for managing the degree of coincidence between the waveform 11 of the focus error signal and the corresponding ideal waveform 12 of the focus error signal, and a pull-in error coincidence degree column 21C for managing the degree of coincidence between the waveform 13 of the pull-in error signal and the corresponding ideal waveform 14 of the pull-in error signal.

In this case, the signal processing unit 6 first compares, for example, the waveform 11 of the focus error signal with the ideal waveform 12 of the focus error signal of the one-layer BD to execute the pattern matching process, and stores the degree of coincidence in the focus error coincidence degree column 21B of the identification result table 21 on the one hand, and compares the waveform 13 of the pull-in error signal with the ideal waveform 14 of the pull-in error signal to execute the pattern matching process and stores the degree of coincidence in the pull-in error coincidence degree column 21C of the identification result table 21 on the other hand.

Also, with regard to the ideal waveforms for the two-layer BD, the four-layer BD, the one-layer HDDVD, the two-layer HDDVD, the three-layer HDDVD, the one-layer DVD, the two-layer DVD, the CD and the absence of a medium, the signal processing unit 6 similarly executes the pattern matching process by performing the comparison operation and stores the resulting degree of coincidence in the focus error coincidence degree column 21B and the pull-in error coincidence degree column 21C of the identification result table 21.

Then, the signal processing unit 6 judges that the optical disk 2 having the ideal waveform with the highest focus error coincidence degree and the highest pull-in error coincidence degree is the optical disk 2 inserted. In FIG. 3, for example, the focus error coincidence degree and the pull-in error coincidence degree of the ideal waveform of the four-layer BD is highest, and therefore, the signal processing unit 6 judges that the inserted optical disk 2 is that of the four-layer BD.

In this way, the optical disk apparatus 1 can identify the one-layer BD, the two-layer BD, the four-layer BD, the one-layer HDDVD, the two-layer HDDVD, the three-layer HDDVD, the one-layer DVD, the two-layer DVD, the CD and the absence of a medium with only the radiation of a predetermined laser.

Figure 4:
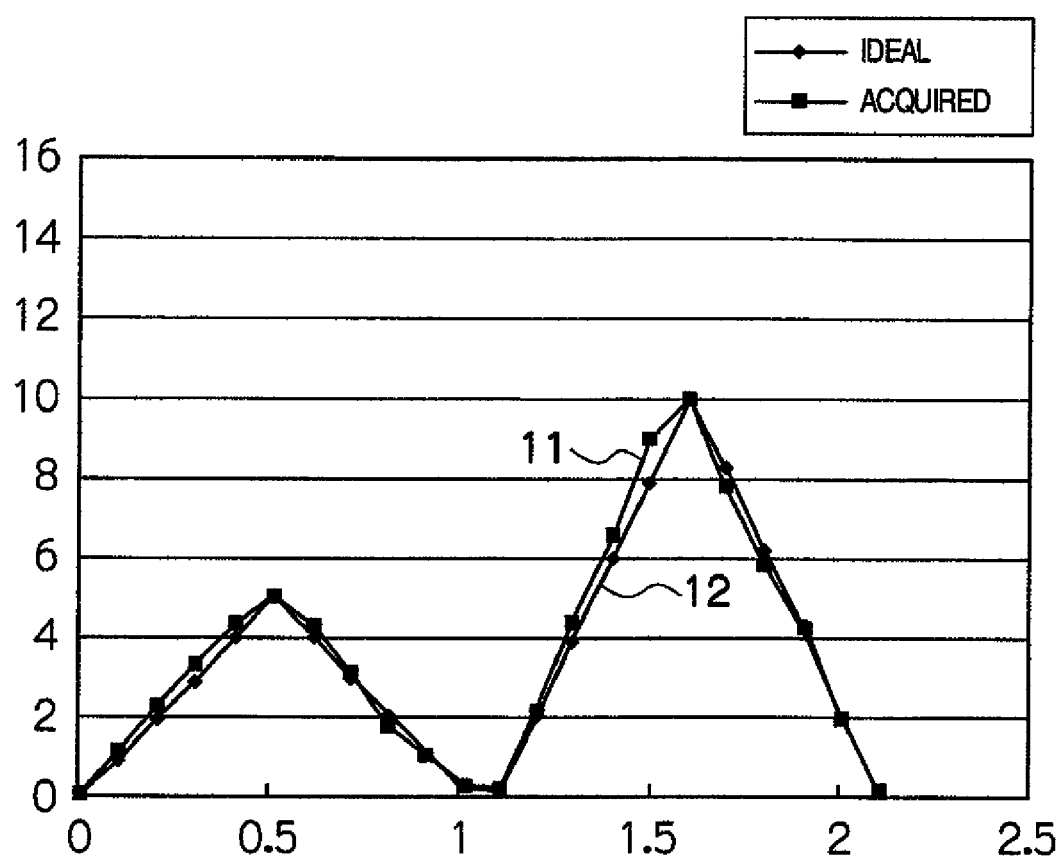
FIG. 4 is a schematic diagram for explaining a pattern matching process.

FIG. 4 is a diagram showing an example of the process of pattern matching executed for the waveform 11 of the focus error signal and the waveform 13 of the pull-in error signal with the corresponding ideal waveform 12 of the focus error signal and the corresponding ideal waveform 14 of the pull-in error signal, respectively.

In FIG. 4, the time function (described later) of the waveform 11 of the focus error signal and the time function (described later) of the corresponding ideal waveform 12 of the focus error signal are plotted. In this graph, the abscissa represents the time, and the ordinate the amplitude value. Also, the word "ideal" indicates the time function of the ideal waveform 12 of the focus error signal, and the word "acquired" the time function of the acquired waveform 11 of the focus error signal.

FIG. 5 is a diagram showing an example of the configuration of the coincidence degree calculation table 22 for calculating the coincidence degree in the pattern matching process developed in the memory 7 of the signal processing unit 6 according to this embodiment.

The coincidence degree calculation table 22 is configured of a time column 22A for uniquely managing the time, an ideal waveform column 22B for managing the amplitude value of the ideal waveform at the particular time, an actual acquisition value column 22C for managing the amplitude value of the waveform acquired at the particular time, a difference column 22D for managing the difference between the amplitude value of the waveform acquired at the particular time and the amplitude value of the ideal waveform, and a total value column 22E for managing the total value of the difference between the amplitude of the acquired waveform and the amplitude value of the ideal waveform.

In this case, for example, the signal processing unit 6 converts the acquired waveform 11 of the focus error signal as a time function while at the same time converting the corresponding ideal waveform 12 of the focus error signal as a time function. Then, the signal processing unit 6 acquires the amplitude value of the time function of the waveform 11 of the focus error signal and the amplitude value of the ideal waveform 12 of the focus error signal at predetermined time intervals, and stores them in the ideal waveform column 22B and the acquisition value column 22C, respectively, in the coincidence degree calculation table 22.

Then, the signal processing unit 6 calculates the difference between the amplitude value as the time function of the waveform 11 of the focus error signal and the amplitude value of the ideal waveform 12 of the focus error signal at the predetermined time intervals, and stores the calculated difference in the difference column 22D of the coincidence degree calculation table 22. After that, the signal processing unit 6 calculates the total value of the difference and stores it in the coincidence degree calculation table 22 (described later).

The signal processing unit 6 calculates the focus error coincidence degree based on the total value calculated above. In this case, the signal processing unit 6 compares the calculated total value with a preset threshold of the total value and thus calculates the focus error coincidence degree. In the process, the signal processing unit 6 judges that the smaller the calculated total value, the higher the focus error coincidence degree. Also, the signal processing unit 6 calculates the pull-in error coincidence degree through similar steps to the calculation of the focus error coincidence degree.

Incidentally, FIGS. 4 and 5 represent a case in which the BD laser is radiated on the BD as the optical disk 2 to execute the process of pattern matching with the ideal waveform 12 of the BD focus error signal, and the calculated total value is a very small 3.3, resulting in a high focus error coincidence degree. This is apparent from the fact that the time function curve of the waveform 11 of the focus error signal substantially coincides with the time function curve of the ideal waveform 12 of the focus error signal in the graph of FIG. 4.

Figure 6:
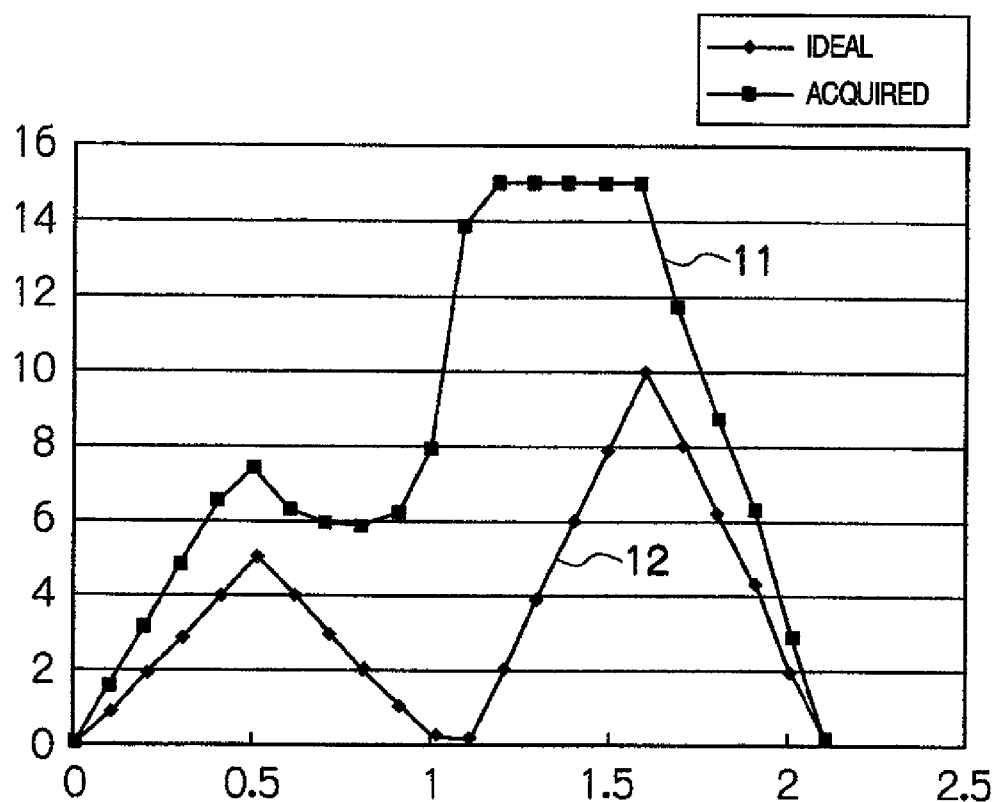
FIG. 6 is a schematic diagram for explaining a pattern matching process.

FIG. 6 is a diagram showing another example of the pattern matching process similar to FIG. 4, and FIG. 7 a diagram showing an example of the configuration of the coincidence degree calculation table 22 similar to FIG. 5.

FIGS. 6 and 7 represent a case in which the BD laser is radiated on the DVD as the optical disk 2 for pattern matching with the ideal waveform 12 of the BD focus error signal. In the example shown in FIGS. 6 and 7, the calculated total value is a large 100.25", and therefore, the focus error coincidence degree is low. This is apparent also from FIG. 6 in which the time function curve of the waveform 11 of the focus error signal is considerably different from the time function curve of the ideal waveform 12 of the focus error signal.

Figure 8:
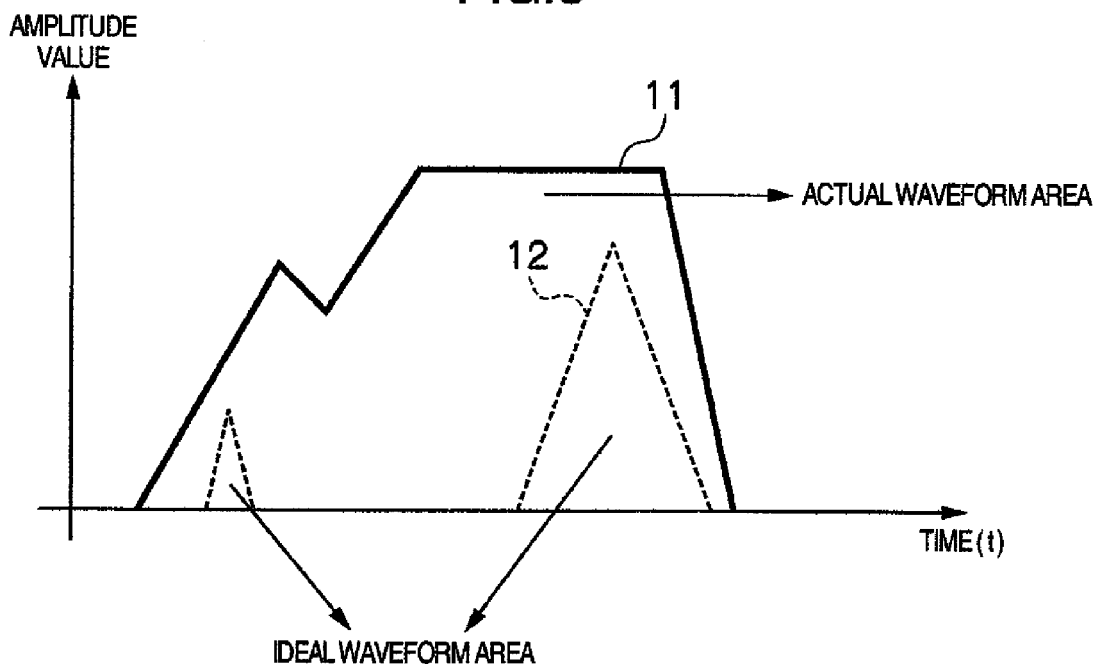
FIG. 8 is a schematic diagram for explaining another example of the pattern matching process.

FIG. 8 is a diagram showing another example of the pattern matching of the waveform 11 of the focus error signal and the waveform 13 of the pull-in error signal with the corresponding ideal waveform 12 of the focus error signal and the corresponding ideal waveform 14 of the pull-in error signal, respectively.

The time function of the waveform 11 of the focus error signal and the time function of the the ideal waveform 12 of the focus error signal are plotted in FIG. 8. In this graph, the abscissa represents the time, and the ordinate the amplitude value. Also, the dashed curves indicate the time function of the ideal waveform 12 of the focus error signal, and the solid curve the time function of the acquired waveform 11 of the focus error signal.

In this case, for example, the signal processing unit 6 converts the acquired waveform 11 of the focus error signal as a time function, and the corresponding ideal waveform 12 of the focus error signal as a time function. Then, the signal processing unit 6 acquires the waveform area of the time function of the waveform 11 of the focus error signal and the waveform area of the ideal waveform 12 of the focus error signal for a predetermined time section using, for example, the Gauss distribution or other method of area calculation.

The signal processing unit 6 calculates the focus error coincidence degree based on the ratio between the waveform areas. In the case under consideration, for example, the signal processing unit 6 calculates the focus error coincidence degree by calculating the percentage which the waveform area of the waveform 11 of the focus error signal represents of the waveform area of the ideal waveform 12 of the focus error signal. The signal processing unit 6 also calculates the pull-in error coincidence degree through similar steps to the calculation of the focus error coincidence degree.

Incidentally, FIG. 8 shows a case in which the BD laser is radiated on the DVD as the optical disk 2 to carry out the process of pattern matching with the ideal waveform 12 of the BD focus error signal, in which case the large calculated ratio between the waveform areas is large shows a low focus error coincidence degree. This is apparent also from FIG. 8 showing that the time function curve of the waveform 11 of the focus error signal is considerably different from the time function curve of the ideal waveform 12 of the focus error signal.

Next, an explanation is given about the disk identification process in the optical disk apparatus 1 according to this embodiment.

Figure 9:
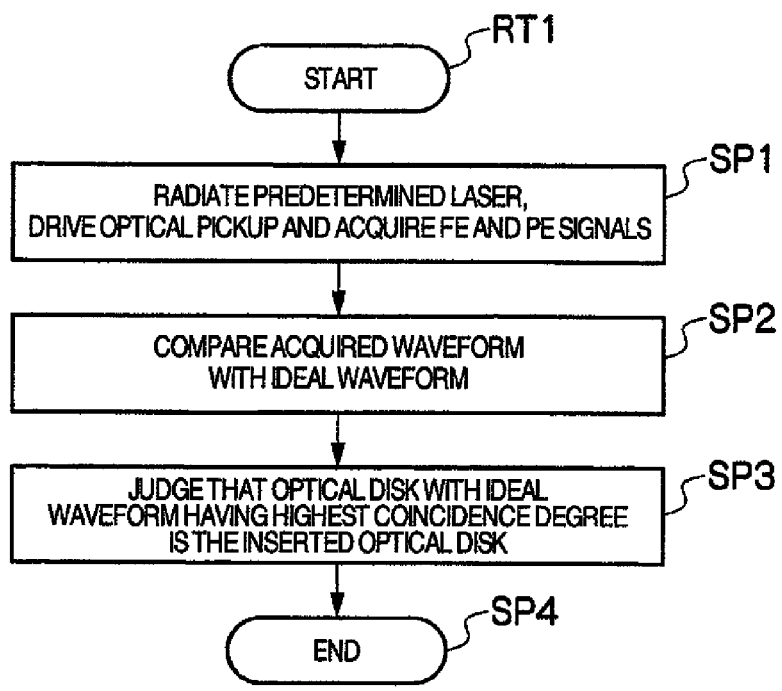
FIG. 9 is a flowchart showing an example of the steps of the disk identification process.

FIG. 9 is a specific example of the flowchart showing the steps of the disk identification process executed by the signal processing unit 6 of the optical disk apparatus 1.

The signal processing unit 6, upon detection that the insertion unit of the optical disk 2 is opened or closed, executes a control program (not shown) stored in the memory 7. An optical disk identification command is transmitted to the driver unit 5 in accordance with the disk identification process RT1 shown in FIG. 9. Then, under the control of the driver unit 5, the optical pickup 4 causes a laser diode (not shown) to emit light and radiate a predetermined laser on the optical disk 2, so that the focus error signal (FE signal) and the pull-in error signal (PE signal) are acquired from the signal of the reflected light acquired by displacing the objective lens 4A of the optical pickup 4 (SP1).

Then, the signal processing unit 6 compares the waveform 11 of the focus error signal and the waveform 13 of the pull-in error signal with the ideal waveforms 12 of the focus error signal and the ideal waveforms 14 of the pull-in error signal of the various optical disks 2 stored in the memory 7 thereby to execute the pattern matching process (SP2). In the process, the signal processing unit 6 may start to execute the pattern matching process from any one of the ideal waveforms 12 of the focus error signal or the ideal waveforms 14 of the pull-in error signal. Incidentally, the pattern matching process is described in detail above.

After that, the signal processing unit 6, by referring to the identification result table 21, judges that the optical disk 2 associated with the ideal waveform having the highest focus error coincidence degree and the highest pull-in error coincidence degree is the inserted optical disk 2 (SP3), and then finishes the disk identification process RT1 shown in FIG. 9 (SP4). Incidentally, in the case where the focus error coincidence degree and the pull-in error coincidence degree are highest in the absence of a medium, the signal processing unit 6 judges that there is no medium inserted.

As described above, in the optical disk apparatus 1, the waveform 11 of the focus error signal and the waveform 13 of the pull-in error signal acquired by radiating one type of laser are compared with the ideal waveforms 12 of the focus error signal and the ideal waveforms 14 of the pull-in error signal of the various types of the optical disk apparatus 2 stored in the memory 7 thereby to judge that the optical disk 2 associated with the ideal waveform having the highest focus error coincidence degree and the highest pull-in error coincidence degree is the optical disk 2 inserted.

In the optical disk apparatus 1, the focus error signal and all the pull-in error signal are sampled and compared as a whole. Even in the case where a spike noise is detected, therefore, the identification accuracy of the optical disk 2 can be improved without regard to the variation or noise at the time of medium identification on the one hand, and the inserted optical disk 2 can be identified by radiating only one type of laser. Thus, the optical disk can be identified both easily and quickly.

Figure 10:
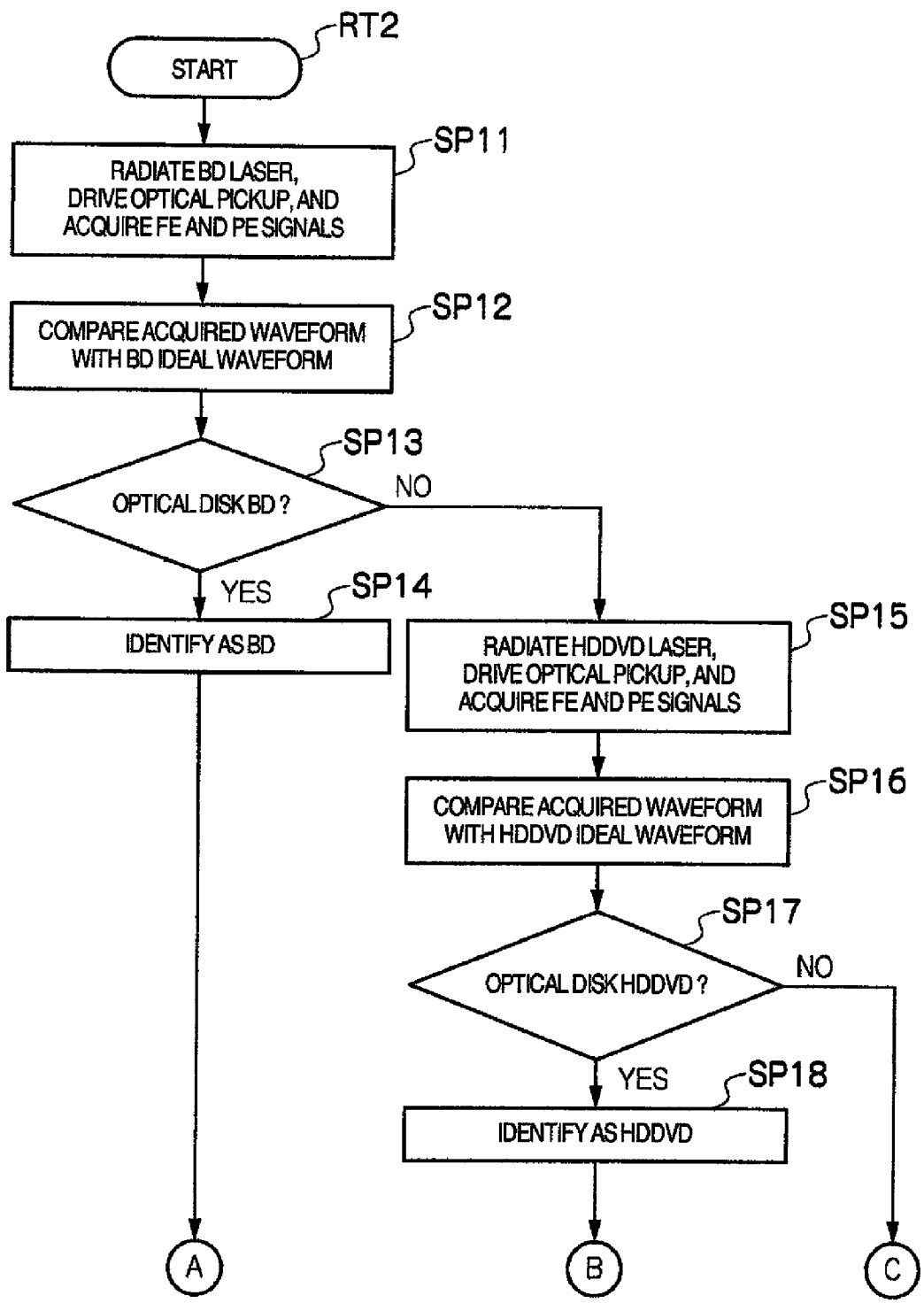
FIG. 10 is a flowchart showing another example of the steps of the disk identification process.
Figure 11:
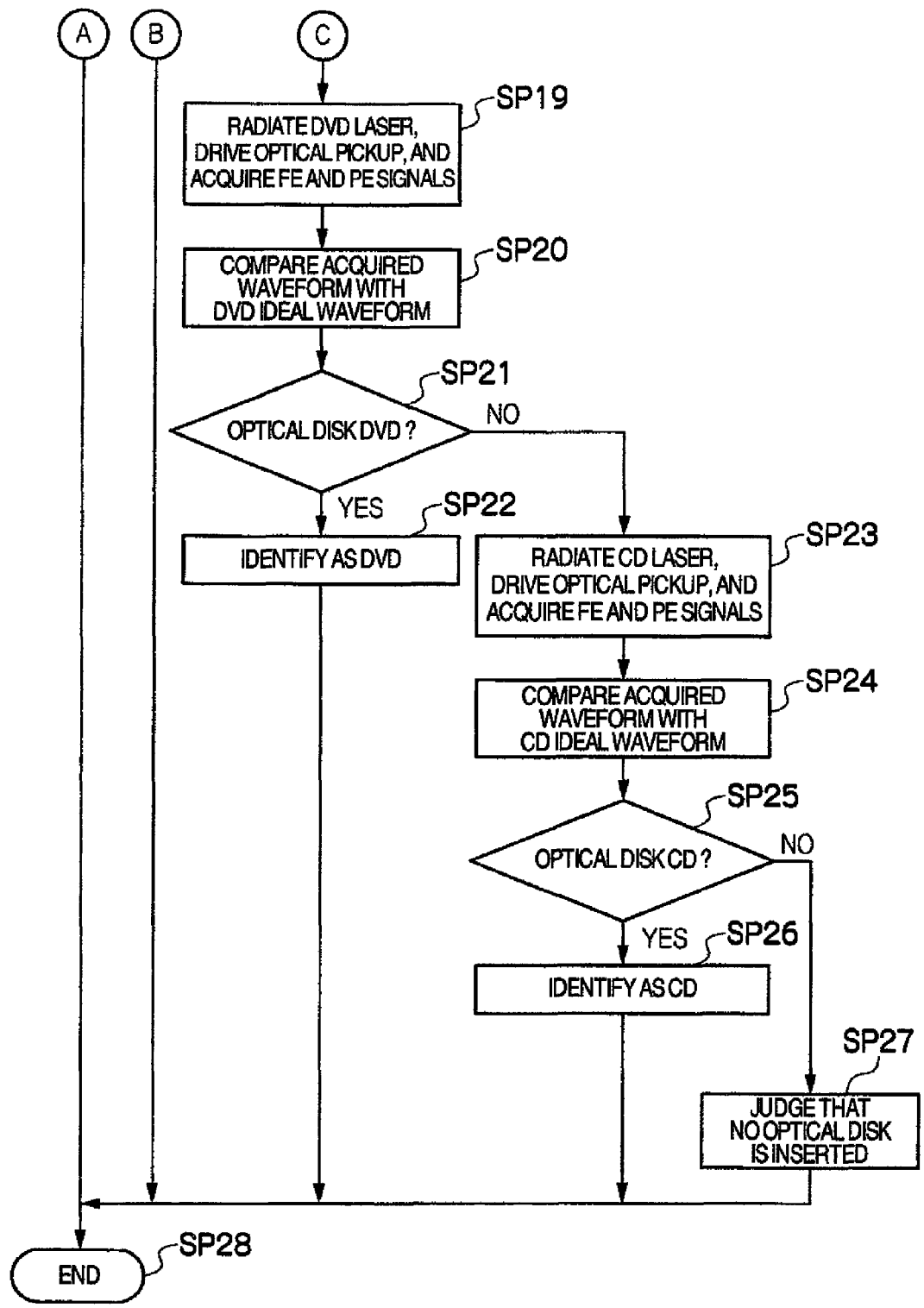
FIG. 11 is a flowchart showing still another example of the steps of the disk identification process.

FIGS. 10 and 11 show another specific example of the flowchart showing the steps of the disk identification process executed by the signal processing unit 6 of the optical disk apparatus 1 according to this embodiment.

The signal processing unit 6, upon detection that the insertion unit of the optical disk 2 is open or closed, for example, executes the control program (not shown) stored in the memory 7. Thus, in accordance with the disk identification process RT2 shown in FIGS. 10 and 11, a command to identify the optical disk is transmitted to the driver unit 5. The optical pickup 4, under the control of the driver unit 5, causes a laser diode to emit light. The BD laser is thus radiated on the optical disk 2, and the focus error signal and the pull-in error signal are acquired from the signal of the reflected light acquired by displacing the objective lens 4A of the optical pickup 4 (SP11).

Then, the signal processing unit 6 compares the waveform 11 of the acquired focus error signal and the waveform 13 of the acquired pull-in error signal with the ideal waveform 12 of the focus error signal the ideal waveform 14 of the pull-in error signal for the BD stored in the memory 7 thereby to execute the pattern matching process (SP12).

After that, the signal processing unit 6 judges whether the inserted optical disk 2 is the BD as the optical disk 2 or not (SP13). In the case where the focus error coincidence degree and the pull-in error coincidence degree resulting from the pattern matching process are not less than a predetermined threshold value, for example, the signal processing unit 6 judges that the inserted optical disk 2 is the BD. Upon judgment that the inserted optical disk 2 is the BD (YES in SP13), the signal processing unit 6 judges that the inserted optical disk 2 is the BD (SP14), after which the disk identification process RT2 shown in FIGS. 10 and 11 is finished (SP28).

The signal processing unit 6, upon judgment that the inserted optical disk 2 is not the BD (NO in SP13), on the other hand, transmits an optical disk identification command to the driver unit 5, so that the optical pickup 4, under the control of the driver unit 5, causes the laser diode to emit light to radiate the HDDVD laser on the optical disk 2. Thus, the focus error signal and the pull-in error signal are acquired from the signal of the reflected light acquired by displacing the objective lens 4A of the optical pickup 4 (SP15).

Then, the signal processing unit 6 executes the pattern matching process by comparing the waveform 11 of the acquired focus error signal and the waveform 13 of the acquired pull-in error signal with the ideal waveform 12 of the HDDVD focus error signal and the ideal waveform 14 of the HDDVD pull-in error signal, respectively, stored in the memory 7 (SP16).

After that, the signal processing unit 6 judges whether the inserted optical disk 2 is the HDDVD or not (SP17). In the case where the focus error coincidence degree and the pull-in error coincidence degree resulting from the pattern matching process are not less than a predetermined threshold value, for example, the signal processing unit 6 judges that the inserted optical disk 2 is the HDDVD. Then, the signal processing unit 6, upon judgment that the inserted optical disk 2 is the HDDVD (YES in SP17), identifies the inserted optical disk 2 as the HDDVD (SP18), after which the disk identification process RT2 shown in FIGS. 10 and 11 is finished (SP28).

The signal processing unit 6, upon judgment that the inserted optical disk 2 is not the HDDVD (NO in SP18), on the other hand, transmits an optical disk identification command to the driver unit 5, so that the optical pickup 4, under the control of the driver unit 5, causes the laser diode to emit light to radiate the DVD laser on the optical disk 2. Thus, the focus error signal and the pull-in error signal are acquired from the signal of the reflected light acquired by displacing the objective lens 4A of the optical pickup 4 (SP19).

Then, the signal processing unit 6 compares the waveform 11 of the acquired focus error signal and the waveform 13 of the acquired pull-in error signal with the ideal waveform 12 of the DVD focus error signal and the ideal waveform 14 of the DVD pull-in error signal stored in the memory 7 thereby to execute the pattern matching process (SP20).

After that, the signal processing unit 6 judges whether the inserted optical disk 2 is the DVD or not (SP21). In the case where the focus error coincidence degree and the pull-in error coincidence degree resulting from the pattern matching process are not less than a predetermined threshold value, for example, the signal processing unit 6 identifies the inserted optical disk 2 as the DVD. Then, the signal processing unit 6, upon judgment that the inserted optical disk 2 is the DVD (YES in SP21), identifies the inserted optical disk 2 as the DVD (SP22), after which the disk identification process RT2 shown in FIGS. 10 and 11 is finished (SP28).

The signal processing unit 6, upon judgment that the inserted optical disk 2 is not the DVD (NO in SP21), on the other hand, transmits an optical disk identification command to the driver unit 5, which controls the optical pickup 4 to causes the laser diode to emit light to radiate the CD laser on the optical disk 2. Thus, the focus error signal and the pull-in error signal are acquired from the signal of the reflected light acquired by displacing the objective lens 4A of the optical pickup 4 (SP23).

Then, the signal processing unit 6 compares the waveform 11 of the acquired focus error signal and the waveform 13 of the acquired pull-in error signal with the ideal waveform 12 of the CD focus error signal and the ideal waveform 14 of the CD pull-in error signal stored in the memory 7 thereby to execute the pattern matching process (SP24).

After that, the signal processing unit 6 judges whether the inserted optical disk 2 is the CD or not (SP25). In the case where the focus error coincidence degree and the pull-in error coincidence degree resulting from the pattern matching process are not less than a predetermined threshold value, for example, the signal processing unit 6 judges that the inserted optical disk 2 is the CD. Then, the signal processing unit 6, upon judgment that the inserted optical disk 2 is the CD (YES in SP25), identifies the inserted optical disk 2 as the CD (SP26), after which the disk identification process RT2 shown in FIGS. 10 and 11 is finished (SP28).

Then, the signal processing unit 6, upon judgment that the inserted optical disk 2 is not the CD optical disk 2 (NO in SP26), judges that the optical disk 2 is not inserted (SP27), after which the disk identification process RT2 shown in FIGS. 10 and 11 is finished (SP28).

As described above, in the optical disk apparatus 1, the waveform 11 of the focus error signal and the waveform 13 of the pull-in error signal acquired by radiating the laser of CD, DVD, HDDVD or BD are compared with the ideal waveform 12 of the focus error signal and the ideal waveform 14 of the pull-in error signal of the corresponding laser, respectively, and in the case where the focus error coincidence degree and the pull-in error coincidence degree are not less than a predetermined threshold value, the inserted optical disk 2 is identified as the optical disk 2 associated with the corresponding laser.

As described above, the optical disk apparatus 1 compares by sampling all the focus error signals and the pull-in error signals. Thus, the accuracy of identifying the optical disk 2 can be improved regardless of the variation or noises such as a spike noise which may be detected at the time of the medium identification. Also, since each acquired waveform is compared with the ideal waveform of the corresponding laser, the accuracy at which the optical disk 2 is identified can be further improved.

FIGS. 12 and 13 are another example of the flowcharts specifically showing the steps of the disk identification process executed by the signal processing unit 6 of the optical disk apparatus 1.

In this case, the memory 7 has stored therein, in addition to the ideal waveform 12 of the focus error signal and the ideal waveform 14 of the pull-in error signal described above, the ideal waveforms 12 of the focus error signal and the ideal waveforms 14 of the pull-in error signal obtained by radiating the DVD laser on the various optical disks 2 such as the CD, the one-layer HDDVD, the two-layer HDDVD, the three-layer HDDVD, the one-layer BD, the two-layer BD and the four-layer BD. Specifically, the memory 7 has stored therein also the ideal waveforms 12 of the focus error signal and the ideal waveforms 14 of the pull-in error signal with the radiation of the laser different from the laser to be radiated originally on the optical disk 2.

This is by reason of the fact that the focus error signal and the pull-in error signal with the DVD laser radiated on the CD or BD making up the optical disk 2 have a substantially predetermined waveform, and therefore, the ideal waveform 12 of the focus error signal and the ideal waveform 14 of the pull-in error signal with the DVD laser radiated on the CD or BD making up the optical disk 2 can be also used for the pattern matching process.

The signal processing unit 6, upon detection that the insertion unit of the optical disk 2 is open or closed, for example, executes a control program (not shown) stored in the memory 7. Thus, in accordance with the disk identification process RT3 shown in FIGS. 12 and 13, an optical disk identification command is transmitted to the driver unit 5. The optical pickup 4, under the control of the driver unit 5, causes a laser diode to emit light. The DVD laser is thus radiated on the optical disk 2, and the focus error signal and the pull-in error signal are acquired from the signal of the reflected light acquired by displacing the objective lens 4A of the optical pickup 4 (SP31).

Then, the signal processing unit 6 compares the waveform 11 of the acquired focus error signal and the waveform 13 of the acquired pull-in error signal with the ideal waveform 12 of the focus error signal and the ideal waveform 14 of the pull-in error signal, respectively, stored in the memory 7 with the DVD laser radiated on the BD optical disk 2 thereby to execute the pattern matching process (SP32).

After that, the signal processing unit 6 judges whether the inserted optical disk 2 is the BD or not (SP33). In the case where the focus error coincidence degree and the pull-in error coincidence degree resulting from the pattern matching process are not less than a predetermined threshold value, for example, the signal processing unit 6 judges that the inserted optical disk 2 is the BD. Then, the signal processing unit 6, upon judgment that the inserted optical disk 2 is the BD (YES in SP33), identifies the inserted optical disk 2 as the BD (SP34), after which the disk identification process RT2 shown in FIGS. 12 and 13 is finished (SP45).

The signal processing unit 6, upon judgment that the inserted optical disk 2 is not the BD (NO in SP33), on the other hand, compares the waveform 11 of the acquired focus error signal and the waveform 13 of the acquired pull-in error signal with the ideal waveform 12 of the focus error signal and the ideal waveform 14 of the pull-in error signal, respectively, obtained by radiating the DVD laser on the HDDVD making up the optical disk 2 and stored in the memory 7 thereby to execute the pattern matching process (SP35).

After that, the signal processing unit 6 judges whether the inserted optical disk 2 is the HDDVD or not (SP36). In the case where the focus error coincidence degree and the pull-in error coincidence degree resulting from the pattern matching process are not less than a predetermined threshold value, for example, the signal processing unit 6 judges that the inserted optical disk 2 is the HDDVD. Then, the signal processing unit 6, upon judgment that the inserted optical disk 2 is the HDDVD (YES in SP36), identifies the inserted optical disk 2 as the HDDVD (SP37), after which the disk identification process RT2 shown in FIGS. 12 and 13 is finished (SP45).

The signal processing unit 6, upon judgment that the inserted optical disk 2 is not the HDDVD (NO in SP36), on the other hand, compares the waveform 11 of the acquired focus error signal and the waveform 13 of the acquired pull-in error signal with the ideal waveform 12 of the DVD focus error signal and the ideal waveform 14 of the DVD pull-in error signal, respectively, stored in the memory 7 thereby to execute the pattern matching process (SP38).

After that, the signal processing unit 6 judges whether the inserted optical disk 2 is the DVD or not (SP39). In the case where the focus error coincidence degree and the pull-in error coincidence degree resulting from the pattern matching process are not less than a predetermined threshold value, for example, the signal processing unit 6 judges that the inserted optical disk 2 is the DVD. Then, the signal processing unit 6, upon judgment that the inserted optical disk 2 is the DVD (YES in SP39), identifies the inserted optical disk 2 as the DVD (SP40), after which the disk identification process RT3 shown in FIGS. 12 and 13 is finished (SP45).

The signal processing unit 6, upon judgment that the inserted optical disk 2 is not the DVD (NO in SP39), compares the waveform 11 of the acquired focus error signal and the waveform 13 of the acquired pull-in error signal with the ideal waveform 12 of the focus error signal and the ideal waveform 14 of the pull-in error signal, respectively, with the DVD laser radiated on the CD making up the optical disk 2 and stored in the memory 7 thereby to execute the pattern matching process (SP41).

After that, the signal processing unit 6 judges whether the inserted optical disk 2 is the CD optical disk 2 or not (SP42). In the case where the focus error coincidence degree and the pull-in error coincidence degree resulting from the pattern matching process are not less than a predetermined threshold value, for example, the signal processing unit 6 judges that the inserted optical disk 2 is the CD. Then, the signal processing unit 6, upon judgment that the inserted optical disk 2 is the CD (YES in SP42), identifies the inserted optical disk 2 as the CD (SP43), after which the disk identification process RT2 shown in FIGS. 12 and 13 is finished (SP45).

The signal processing unit 6, upon judgment that the inserted optical disk 2 is not the CD (NO in SP42), on the other hand, judges that the optical disk 2 is not inserted (SP43), and the disk identification process RT3 shown in FIGS. 12 and 13 is finished (SP45).

As described above, in the optical disk apparatus 1, the waveform 11 of the focus error signal and the waveform 13 of the pull-in error signal acquired by radiating one type of laser are compared with the ideal waveform 12 of the focus error signal and the ideal waveform 14 of the pull-in error signal which are stored in the memory 7 and which are obtained by radiating the laser of the type different from the one to be originally radiated on the optical disk 2 and corresponding to the type of laser other than the radiated one thereby to judge that the optical disk 2 with the ideal waveform having the highest focus error coincidence degree and the highest pull-in error coincidence degree is the inserted optical disk 2.

In the optical disk apparatus 1, therefore, all the focus error signals and the pull-in error signals are compared by sampling. Regardless of whether the variation or noise such as a spike noise is detected at the time of the medium identification, for example, the accuracy of identifying the optical disk 2 can be improved. Also, since the inserted optical disk 2 can be identified by radiating only one type of laser, the optical disk apparatus 1 can identify the optical disk both easily and quickly on the one hand, and the comparison of the acquired waveform with the ideal waveform of the laser corresponding to the acquired waveform can further improve the accuracy at which the optical disk 2 is identified on the other hand.

In this way, the optical disk apparatus 1 operates in such a way that the focus error signal and the pull-in error signal are acquired from the reflected light obtained by radiating a predetermined laser on the optical disk 2, and the waveform 11 of the acquired focus error signal and the waveform 13 of the acquired pull-in error signal are compared with the ideal waveform 12 of the focus error signal and the ideal waveform 14 of the pull-in error signal corresponding to the radiated laser, so that the type of the optical disk is identified based on the comparison result.

Regardless of whether the variation or noise such as a spike noise is detected at the time of the medium identification, therefore, the comparison by sampling all the focus error signals and the pull-in error signals improves the accuracy of identifying the optical disk 2.

Although plural types of optical disks 2 are identified in this embodiment, the present invention is not limited to this embodiment. In the case where the optical disk 2 is formed of plural layers, for example, the ideal waveform 12 of the focus error signal and the ideal waveform 14 of the pull-in error signal obtained by radiation of the corresponding laser on the optical disk for each layer of the optical disk are stored in the memory 7 and compared thereby to identify the number of the layers of the particular optical disk 2.

Also, this embodiment is described above with reference to a case in which the optical disk 2 is identified by radiating the DVD laser in FIGS. 12 and 13. This invention is not limited to this embodiment, and applicable to various other cases including a case in which the laser is radiated twice, i.e. the BD laser is radiated to judge whether the BD makes up the optical disk 2, followed by radiating the DVD laser to judge whether the HDDVD, the DVD or the CD is involved or the medium is absent.

Further, according to this embodiment, the comparison is made for the BD, the HDDVD, the DVD and the CD in that order. However, the invention is not limited to such a case, and various other cases are applicable. For example, the comparison may alternatively be made for the CD, the DVD, the HDDVD and the BD in that order, or only a predetermined optical disk may be compared.

Also, according to this embodiment, the waveform 11 of the focus error signal and the waveform 13 of the pull-in error signal are compared with the ideal waveform 12 of the focus error signal and the ideal waveform 14 of the pull-in error signal, respectively. This invention, however, is not limited to such a case, but applicable with equal effect to various other signals including the tracking signal.

Furthermore, in place of the ideal waveform 12 of the focus error signal and the ideal waveform 14 of the pull-in error signal with which the waveform 11 of the focus error signal and the waveform 13 of the pull-in error signal, respectively, are compared according to this embodiment described above, the invention may alternatively use various other comparative waveforms such as a comparative waveform of the focus error signal and a comparative waveform of the pull-in error signal.

This invention can find wide application to the optical disk apparatuses for reproducing the information from plural types of optical disks.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk apparatus for recording and/or reproducing information in and/or from a plurality of types of optical disks, comprising:

an acquisition unit configured to acquire a predetermined type of signal from reflected light obtained by radiating a predetermined type of laser on an optical disk;

a comparator configured to perform a comparison of the waveform of the signal acquired by the acquisition unit with a comparative waveform of the signal, each comparative waveform obtained by radiating a predetermined type of laser on a predetermined type of optical disk, and each comparative waveform being stored in a memory before use in a comparison; and an identification unit configured to identify the type of the optical disk based on the result of at least one comparison performed by the comparator, the identification unit using at least one coincidence degree value;

wherein each coincidence degree value is based on a difference between a time function of the waveform of the signal acquired by the acquisition unit, and a time function of a comparative waveform used in the at least one comparison.

2. The optical disk apparatus according to claim 1, wherein the acquisition unit is configured to radiate a predetermined type of laser on an optical disk;

wherein the comparator is configured to compare the waveform of the signal acquired by the acquisition unit with the comparative waveforms of all the types of optical disks stored in the memory; and wherein the identification unit is configured to identify that the type of the optical disk irradiated with the laser corresponds to the type with the comparative waveform having the highest coincidence degree value between the waveform of the signal acquired by the acquisition unit and any of the comparative waveforms of all the types of optical disks stored in the memory.

3. The optical disk apparatus according to claim 1, wherein the acquisition unit is configured to acquire the signals of a plurality of types of optical disks by radiating the lasers of the plurality of types of the optical disks on an optical disk;

wherein the comparator is configured to compare the waveforms of the signals acquired by the acquisition unit with the comparative waveform of the optical disk corresponding to the type of the radiated laser; and wherein the identification unit is configured to identify that a type of optical disk corresponding to a comparative waveform is a type of optical disk typically irradiated with the predetermined type of laser, when the coincidence degree value between the waveform of the signal acquired by the acquisition unit and the comparative waveform of the optical disk corresponding to the type of the radiated laser is not less than a predetermined threshold value.

4. The optical disk apparatus according to claim 1, wherein the acquisition unit is configured to radiate a predetermined one-type of laser on an optical disk;

wherein the comparator is configured to compare the waveform of the signal acquired by the acquisition unit with a comparative waveform of the signal stored in the memory and corresponding to a type of radiated laser different from the laser originally radiated on the plurality of types of the optical disks; and wherein the identification unit is configured to identify that a type of optical disk corresponding to a comparative waveform is a type of optical disk typically irradiated with the predetermined type of laser different from the laser to be originally radiated on the plurality of types of optical disks, when the coincidence degree value between the waveform of the signal acquired by the acquisition unit and the comparative waveform of the signal associated with the radiated laser different from the laser to be originally radiated on the optical disk is not less than a predetermined threshold value.

5. The optical disk apparatus according to claim 1, wherein the predetermined type of signal includes at least one of a focus error signal and a pull-in error signal.

6. The optical disk apparatus according to claim 1, wherein the memory is configured to store a comparative waveform of the signal for each of the lasers corresponding to the plurality of types of optical disks radiated for each layer of the plurality of types of optical disks, when the plurality of types of optical disks are formed of a plurality of layers.

7. A disk identification method for an optical disk apparatus to record and/or reproduce the information in and/or from a plurality of types of optical disks, comprising:
   a first step executed by an acquisition unit, of acquiring a predetermined type of signal from reflected light obtained by radiating a predetermined type of laser on an optical disk of an unknown type;
   a second step executed by a comparator, of performing at least one comparison of the waveform of the signal acquired in the first step with a comparative waveform of the signal stored in a memory, each comparative waveform obtained by radiation of a predetermined type of laser on a predetermined type of optical disk; and
   a third step executed by an identification unit, including identifying the type of the optical disk based on the result of at least one comparison performed in the second step, the identification unit using at least one coincidence degree value;
   wherein each coincidence degree value is based on a difference between a time function of the waveform of the signal acquired by the acquisition unit, and a time function of a comparative waveform used in the at least one comparison.

8. The disk identification method according to claim 7,
   wherein the first step includes radiating a predetermined type of laser on an optical disk;
   wherein the second step includes performing a comparison of the waveform of the signal acquired in the first step with comparative waveforms of all the types of optical disks stored in the memory; and
   wherein the third step includes determining that the type of the optical disk irradiated with the laser corresponds to the type with the comparative waveform with the highest coincidence degree value between the waveform of the signal acquired in the first step and the comparative waveforms of all the types of optical disks stored in the memory.

9. The disk identification method according to claim 7,
   wherein the first step includes acquiring the signals of plurality of types of optical disks by radiating the laser for the plurality of types of optical disks on an optical disk;
   wherein the second step includes performing a comparison of the waveform of the signal acquired in the first step with the comparative waveforms for the plurality of types of optical disks corresponding to the plurality of types of radiated laser; and
   wherein the third step includes determining that the type of the optical disk corresponding to a comparative waveform is a type of optical disk typically irradiated with the predetermined type of laser, when the coincidence degree value between the waveforms of the signals acquired in the first step and the comparative example of the optical disk corresponding to the type of the laser radiated is not less than a predetermined threshold value.

10. The disk identification method according to claim 7,
    wherein the first step includes radiating a predetermined type of laser on an optical disk;
    wherein the second step includes performing a comparison of the waveform of the signal acquired in the first step with the comparative waveform of a signal corresponding to other than the type of the radiated laser which is stored in the memory and which is different from the laser to be originally radiated on the plurality of types of optical disks;
    wherein the third step includes determining that a type of optical disk corresponding to the comparative waveform is a type of optical disk typically irradiated with the predetermined type of laser, when the coincidence degree value between the waveform of the signal acquired in the first step and the comparative example of the signal of the radiated laser different from the laser to be originally radiated on the plurality of types of optical disks is not less than a predetermined threshold value.

11. The disk identification method according to claim 7,
    wherein the predetermined type of signal includes at least one of a focus error signal and a pull-in error signal.

12. The disk identification method according to claim 7,
    wherein the memory stores, prior to the comparison, a comparative waveform of the signal with the laser corresponding to one of the plurality of types of optical disks radiated for each layer of the plurality of types of optical disks, when the plurality of types of optical disks are formed of a plurality of layers.

13. An optical disk apparatus for recording and/or reproducing the information in and/or from a plurality of types of optical disks, comprising:
    an acquisition unit configured to acquire a predetermined type of signal from reflected light obtained by radiating a predetermined type of laser on an optical disk of an unknown type;
    a comparator configured to perform a comparison of the waveform of the signal acquired by the acquisition unit with an ideal waveform of the signal, each ideal waveform obtained by radiating a predetermined type of laser on a predetermined type of optical disk, and each ideal waveform having been stored in a memory before use in a comparison; and
    an identification unit configured to identify the type of the optical disk based on the result of at least one comparison performed by the comparator, the identification unit using at least one coincidence degree value;
    wherein each coincidence degree value is based on a difference between a time function of the waveform of the signal acquired by the acquisition unit, and a time function of an ideal waveform used in the at least one comparison.

14. The optical disk apparatus according to claim 1,
    wherein a coincidence degree value is calculated for each type of optical disk inserted into the optical disk apparatus; and
    wherein each coincidence degree value is based on a ratio of waveform areas, between a time function of the waveform of the signal acquired by the acquisition unit, and a time function of an ideal waveform.

15. The disk identification method according to claim 7,
    wherein a coincidence degree value is calculated for each type of optical disk inserted into the optical disk apparatus; and
    wherein each coincidence degree value is based on a ratio of waveform areas, between a time function of the waveform of the signal acquired by the acquisition unit, and a time function of an ideal waveform.

16. The optical disk apparatus according to claim 13, wherein a coincidence degree value is calculated for each type of optical disk inserted into the optical disk apparatus; and wherein each coincidence degree value is based on a ratio of waveform areas, between a time function of the waveform of the signal acquired by the acquisition unit, and a time function of an ideal waveform.

* * * * *